United States Patent
Rheaume et al.

(10) Patent No.: US 10,179,309 B2
(45) Date of Patent: Jan. 15, 2019

(54) ON-BOARD AIRCRAFT DRIED INERT GAS SYSTEM

(71) Applicant: HAMILTON SUNDSTRAND CORPORATION, Windsor Locks, CT (US)

(72) Inventors: Jonathan Rheaume, West Hartford, CT (US); Brian St. Rock, Andover, CT (US); Charles E. Lents, Amston, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 139 days.

(21) Appl. No.: 15/238,287

(22) Filed: Aug. 16, 2016

(65) Prior Publication Data
US 2018/0050300 A1    Feb. 22, 2018

(51) Int. Cl.
| | |
|---|---|
| B01D 53/32 | (2006.01) |
| B01D 53/26 | (2006.01) |
| B64D 37/32 | (2006.01) |
| C25B 9/18 | (2006.01) |
| F24F 3/14 | (2006.01) |
| A62C 3/08 | (2006.01) |
| B64D 13/02 | (2006.01) |
| B64D 13/06 | (2006.01) |
| A62C 99/00 | (2010.01) |
| B01D 53/30 | (2006.01) |

(52) U.S. Cl.
CPC ............. *B01D 53/326* (2013.01); *A62C 3/08* (2013.01); *A62C 99/0018* (2013.01); *B01D 53/265* (2013.01); *B64D 13/02* (2013.01); *B64D 13/06* (2013.01); *B64D 37/32* (2013.01); *C25B 9/18* (2013.01); *F24F 3/1405* (2013.01); *B01D 53/30* (2013.01); *B01D 2259/4575* (2013.01)

(58) Field of Classification Search
None
See application file for complete search history.

(56) References Cited

U.S. PATENT DOCUMENTS

| | | | |
|---|---|---|---|
| 3,847,298 A | 11/1974 | Hamilton | |
| 6,316,135 B1 * | 11/2001 | Breault | H01M 8/04029 429/438 |
| 8,727,282 B2 | 5/2014 | Stolte et al. | |
| 8,813,860 B2 | 8/2014 | Bleil | |
| 9,102,416 B1 | 8/2015 | Cutlet | |

(Continued)

FOREIGN PATENT DOCUMENTS

| | | |
|---|---|---|
| EP | 2927130 A1 | 10/2015 |
| EP | 3023518 A1 | 5/2016 |

OTHER PUBLICATIONS

European Search Report from the European Patent Officer for EP Application No. 17186413.5 dated Jan. 24, 2018, 6 pages.

*Primary Examiner* — Jacob B Marks
(74) *Attorney, Agent, or Firm* — Cantor Colburn LLP

(57) ABSTRACT

An on-board aircraft dried inert gas system includes a source inert gas containing water, an air cycle or vapor cycle cooling system, and a heat exchanger condenser. The heat exchanger condenser has a heat absorption side in thermal communication with the air cycle or vapor cycle cooling system. The heat exchanger condenser has a heat rejection side that receives the inert gas containing water and outputs dried inert gas.

18 Claims, 7 Drawing Sheets

(56) References Cited

U.S. PATENT DOCUMENTS

| | | |
|---|---|---|
| 9,118,054 B2 | 8/2015 | Gummalla et al. |
| 9,174,740 B2 | 11/2015 | Stolte et al. |
| 2014/0087283 A1 | 3/2014 | Stolte et al. |
| 2015/0017557 A1 | 1/2015 | Hoffjann et al. |
| 2015/0040986 A1 | 2/2015 | Tichborne et al. |
| 2016/0030781 A1* | 2/2016 | Hoffjann ........... H01M 8/04932 169/46 |
| 2016/0144973 A1 | 5/2016 | Darling et al. |

* cited by examiner

ON-BOARD AIRCRAFT DRIED INERT GAS SYSTEM

BACKGROUND

This disclosure relates to aircraft and aircraft systems, and in particular to an on-board aircraft dried inert gas generation system.

It is recognized that fuel vapors within fuel tanks become combustible in the presence of oxygen. An inerting system decreases the probability of combustion of flammable materials stored in a fuel tank by maintaining a chemically non-reactive or inert gas, such as oxygen-depleted air, in the fuel tank vapor space also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as oxygen-depleted air (ODA) to the ullage, thereby displacing oxygen with a mixture of nitrogen and oxygen at target thresholds for avoiding explosion or combustion.

It is known in the art to equip aircraft with onboard inert gas systems, which supply oxygen-depleted air to the vapor space (i.e., ullage) within the fuel tank. The oxygen-depleted air has a substantially reduced oxygen content that reduces or eliminates combustible conditions within the fuel tank. Onboard inert gas systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and ODA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions such as during aircraft descent can lead to an increased demand for ODA at precisely the time when engines could be throttled back for fuel savings so that that maintaining sufficient compressed air pressure for meeting the pneumatic demands may come at a significant fuel burn cost. Additionally, there is a trend to reduce or eliminate bleed-air systems in aircraft; for example Boeing's 787 has a no-bleed systems architecture, which utilizes electrical systems to replace most of the pneumatic systems in order to improve fuel efficiency, as well as reduce weight and lifecycle costs. Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided in the past to conventional onboard environmental control systems. A separate compressor or compressors can be used to provide pressurized air to the membrane gas separator, but this undesirably increases aircraft payload, and also represents another onboard device with moving parts that is subject to maintenance issues or device failure.

The concern with combustion as a significant risk management issue for aircraft is not limited to the fuel tanks, and commercial and military aircraft are often equipped with fire suppression technology such as halocarbon systems that disperse a halocarbon such as Halon 1301 as a clean fire suppressant. Halocarbons interrupt the chain reactions that propagate the combustion process. Unfortunately, although halocarbons are deleterious to the ozone layer and are furthermore greenhouse gases, it has been difficult to discontinue their use because of a dearth of viable alternatives. Typically multiple tanks of Halon are on board aircraft for fire suppression with respect to both the initial inrush (knockdown) as well as for the replacement of Halon and air lost to leakage at a low rate of discharge (LRD).

BRIEF DESCRIPTION

According to some embodiments of this disclosure, an on-board aircraft dried inert gas system comprises a source inert gas comprising water, an air cycle or vapor cycle cooling system, and a heat exchanger condenser. The heat exchanger condenser has a heat absorption side in thermal communication with the air cycle or vapor cycle cooling system. The heat exchanger condenser has a heat rejection side that receives the inert gas comprising water and outputs dried inert gas.

In some embodiments of the disclosure, an on-board aircraft inert gas system comprises a source of hydrogen and a plurality of electrochemical cells. The electrochemical cells individually comprise a cathode and an anode separated by a proton exchange membrane electrolyte separator. A cathode fluid flow path is in fluid communication with the cell cathodes, and receives a flow of air from an air source and discharges oxygen-depleted air. An anode fluid flow path is in fluid communication with the cell anodes. A water flow path is in fluid communication with the proton exchange electrolyte separators. An electrical circuit connects the anode and the cathode, and provides voltage that forms hydrogen ions at the anode and forms water at the cathode. A heat exchanger condenser comprises a heat absorption side in thermal communication with a heat sink, a heat rejection side that condenses water from fluid from the cathode fluid flow path, and a water outlet in fluid communication with the water flow path.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

As mentioned above, this disclosure relates to on-board aircraft inert gas system. As used herein, the term "aircraft" includes any powered conveyance device capable of sustaining flight. As mentioned above, the inert gas system includes a source of an inert gas where the inert gas comprises water (e.g., water vapor). Inert gas sources that generate an inert gas that can include water can include inert gas generators comprising a reactor that reacts oxygen in a feed gas with hydrogen or hydrocarbon to produce an oxygen-depleted gas that contains water. Inert gas generators that react hydrogen or hydrocarbon with oxygen to consume the oxygen can include PEM electrochemical cells that react oxygen with hydrogen at the cathode(s) or catalytic reactors such as described for example in U.S. Pat. No. 7,694,916, the disclosure of which is incorporated by reference in its entirety.

Figure 1:
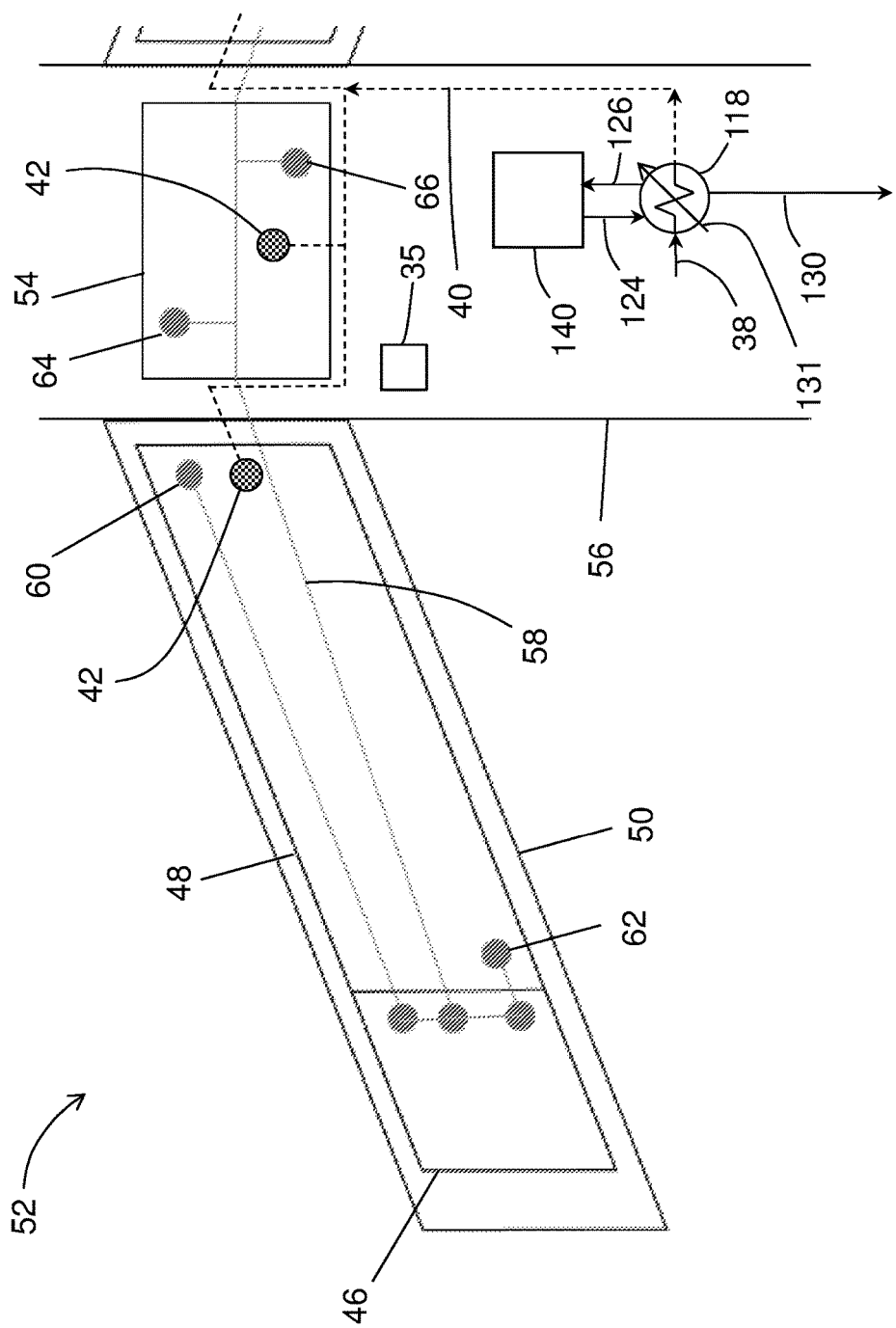
FIG. 1 is a schematic depiction of an example embodiment of a dried inert gas system.

Referring now to the Figures, in which the same numbering may be used in more than one Figure to represent the same feature without the necessity of explicit repetition in the description for each Figure, FIG. 1 is a schematic depiction of an onboard inert aircraft gas system. As shown in FIG. 1, a left wing vent box 46 is disposed along with wing fuel tank 48 in a wing 50 of an aircraft 52. The aircraft 52, depicted in a partial view in FIG. 1, also includes a center tank 54 disposed in fuselage 56, and also a right wing and tank and vent box (not shown), with the fuel tanks sharing a common vent system 58 that includes left wing climb vent 60, a left wing dive vent 62, center tank climb vent 64, center tank dive vent 66, and other unnumbered vents depicted by the same circular shapes as the numbered vents. As shown in the example embodiment of FIG. 1, a source (not shown) of a water-containing inert gas 38 is fed to a heat rejection side of a heat exchanger condenser 118, where it rejects heat to a heat absorption side that is in thermal communication with an on-board air cycle or vapor cycle cooling system 140 that provides a flow of relatively cool fluid 124 to absorb heat from the water-containing inert gas 38. The heat absorption side outlet stream 126 from the heat exchanger condenser 118 can be returned to the air or vapor cycle cooling system 140 by path 126 as shown in FIG. 1, used in another onboard process, or discharged overboard by path 130. Condensate 131 from the heat exchanger condenser 118 can be dumped overboard or used in another process (e.g., to provide evaporative cooling). Dried inert air exiting from the heat exchanger condenser 118 is directed through inert gas vent lines 40 to fuel tank inert gas vents 42. The inert gas flow can be aided by a blower (not shown). In some embodiments, the inert gas system can provide one or more technical effects, including but not limited to condensing water vapor from an inert gas to avoid introducing it to a fuel tank. The removal water from the inert gas by condensation can be maximized by lowering the temperature of the inert gas to below the dew point with attention to avoid freezing. Compared to an ambient air-cooled heat exchanger, the thermal connection of heat exchanger condenser 118 to an on-board air cycle or vapor cycle cooling system can in some embodiments provide effective condensation across a wider variety of conditions including on the ground or at low altitudes (e.g., less than 10,000 feet) where air temperatures are more likely to be above the dew point, thus ambient air may be less effective for condensation. In some embodiments, the heat exchanger condenser 118 and thermal connection to the on-board air cycle or vapor cycle cooling system can provide maximum condensation in conditions including on the ground or at low altitudes (e.g., less than 10,000 feet).

In some embodiments, a controller 35 can be in operative communication with the above-referenced components and any associated valves, pumps, compressors, conduits, or other fluid flow components, and with switches, inverters, regulators, sensors, and other electrical system components, and any other system components to selectively operate the inert gas system. These control connections can be through wired electrical signal connections (not shown) or through wireless connections. In some embodiments, the controller 35 can be configured to operate the system according to specified parameters, as discussed in greater detail further below.

Figure 2:
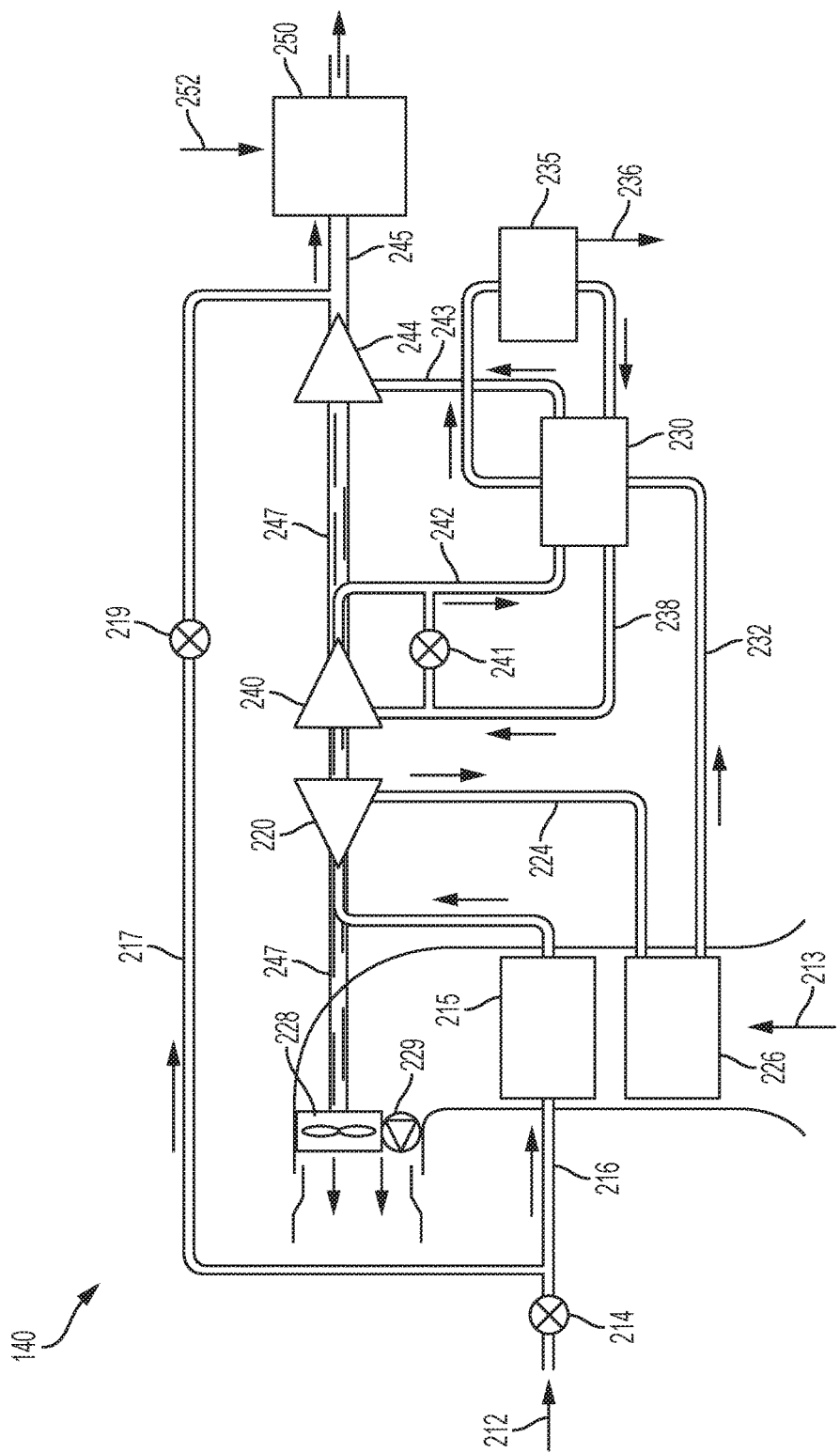
FIG. 2 is a schematic depiction of an example embodiment of an air cycle cooling system.

An example embodiment of on-board air cycle cooling system 140 is schematically depicted in FIG. 2. Air cycle cooling system depicts a so-called "four-wheel" system, referring to the four rotating devices (a ram air fan, one compressor, and two turbines), but "three-wheel" systems having only a single turbine are also contemplated. As shown in FIG. 2, compressed air 212 from a compressed air source (not shown) such as a pre-cooled turbine engine bleed, an APU bleed, or an electrically-powered compressor is delivered through control valve 214. From there, the compressed air is directed to a heat exchanger 215 (also referred to in the art as a primary heat exchanger) where it rejects heat to ambient air flowing through or across a heat absorption side of heat exchanger 215. Cooled compressed air is discharged from heat exchanger 215 to compressor 220. A portion of the air going to heat exchanger 215 can be controllably diverted through conduit 217 and control/expansion valve 219 to mix with the outlet of turbine 244 and control the temperature of the conditioned air exiting the system. Compressor 220 compresses its portion of the air from the heat exchanger 215, which also results in heating of the air. The further compressed air is discharged from compressor 220 through conduit 224 to heat exchanger 226 (also referred to in the art as a secondary heat exchanger) where it rejects heat to ambient air flowing through or across a heat absorption side of heat exchanger 226.

The ambient air 213 flowing through or across the heat absorption sides of heat exchangers 215 and 226 can be a ram air flow from a forward-facing surface of the aircraft. In conditions under which insufficient airflow is generated by the forward motion of the aircraft for operation of the heat exchangers 215, 226, the air flow can be assisted by operation of fan 228. Check/bypass valve 229 allows for bypass of the fan 228 when ram air flow is sufficient for the needs of the heat exchangers 215 and 226. Heat exchangers 215 and 226 can share a flow path for the ambient cooling air, and can be integrated into a single unit with heat exchanger 215 sometimes referred to as a primary heat exchanger and heat exchanger 226 sometimes referred to as a secondary heat exchanger. Cooled air discharged from heat exchanger 226 is delivered through conduit 232 to a heat rejection side of heat exchanger 230. In the heat rejection side of heat exchanger 230, the air is further cooled to a temperature at or below the dew point of the air and flows into water removal unit 235 where liquid water 236 condensed from the air is removed. The dehumidified air flows through a heat absorption side of heat exchanger 230 where it is re-heated before being delivered through conduit 238 to turbine 240, where work is extracted as the air is expanded and cooled by turbine 240. A portion of the air going to turbine 240 can be diverted by valve 241 if needed to allow the temperature of the air at the inlet to the heat absorption side of heat exchanger 230 to be above freezing. The cooled expanded air discharged from the turbine 240 is delivered through conduit 242 to a heat absorption side of heat exchanger 230 where it along with the dehumidified air discharged from water collection unit 235 provides cooling needed to condense water vapor from air on the heat rejection side of heat exchanger 230. The air streams on the heat absorption side of the heat exchanger 230 are thus reheated. Heat exchanger 230 is also sometimes referred to as a condenser/reheater, and can be integrated with water removal unit 235 in a single unit. The reheated air from conduit 242 exiting from the heat absorption side of heat exchanger 230 flows through conduit 243 to turbine 244, where it is expanded and cooled, and then discharged from the system 140 through conduit 245 to mix manifold 250 where it is mixed with cabin air 252 before being discharged to the aircraft cabin. The environment air conditioning system 140 also includes a power transfer path 247 such as a rotating shaft that transfers power to the compressor 220 and fan 228 from work extracted by turbines 240 and 244.

As mentioned above, the air cycle or vapor cycle cooling system is in thermal communication with (i.e., provides cooling to) the heat absorption side of the heat exchanger condenser 118 (FIG. 1). In the case of the four-wheel system of FIG. 2, this can be provided in some embodiments by directing a portion of the conditioned air from conduit 245 to the heat absorption side of the heat exchanger condenser 118. In some embodiments, a portion of intermediate conditioned air from the system 140 prior to expansion in the second turbine 244 (e.g., air discharged from turbine 240 in conduit 242) can be directed to the heat absorption side of heat exchanger condenser 118. One can also use a liquid intermediate heat transfer fluid such as ethylene glycol to provide a thermal connection between the cold sink and the heat exchanger condenser 118. Regardless of the cold sink, attention must be paid to avoiding freezing the water. After absorbing heat from the heat exchanger condenser 118, the conditioned air can be returned to the air cycle cooling system, used in other on-board processes, or discharged overboard. In some embodiments, a vapor cycle cooling system (not shown) can be disposed on-board the aircraft to provide cooling to the heat absorption side of the heat exchanger condenser 118 (FIG. 1). A typical vapor cycle cooling system can rely on a two-phase refrigerant such as an organic compound that is cycled through a vapor-compression loop cycle comprising a compressor, a condenser, an expansion device, and an evaporator. Heat absorbed by the refrigerant in the evaporator provides cooling to the heat absorption side of the heat exchanger condenser 118, and heat transfer can be accomplished by flowing the inert gas comprising water directly across vapor cycle system evaporator coils disposed in the heat exchanger condenser 118, or indirectly via a heat transfer fluid flowing between the evaporator coils and the heat exchanger condenser 118. In some embodiments, the utilization of an air cycle or vapor cycle cooling system can provide more effective removal of water across a variety of ambient environmental conditions (e.g., at high altitude (e.g., above 10,000 feet), low altitude (e.g., below 10,000 feet), or on the ground) compared to inert gas systems utilizing ambient air cooling. Such cooling can be important to both catalytic inert gas systems (which can generate 13 molecules of water for every fuel vapor molecule, based on n-dodecane as a model jet fuel molecule) or for electrochemical inert gas systems (which can produce oxygen-depleted air at a relative humidity level at or close to 100%). In some embodiments, the air cycle or vapor cycle cooling system provides fluid to the heat absorption side of the heat exchanger condenser 118 at a temperature less than or equal to 40° F., more specifically 25° F., even more specifically 15° F.

Figure 3:
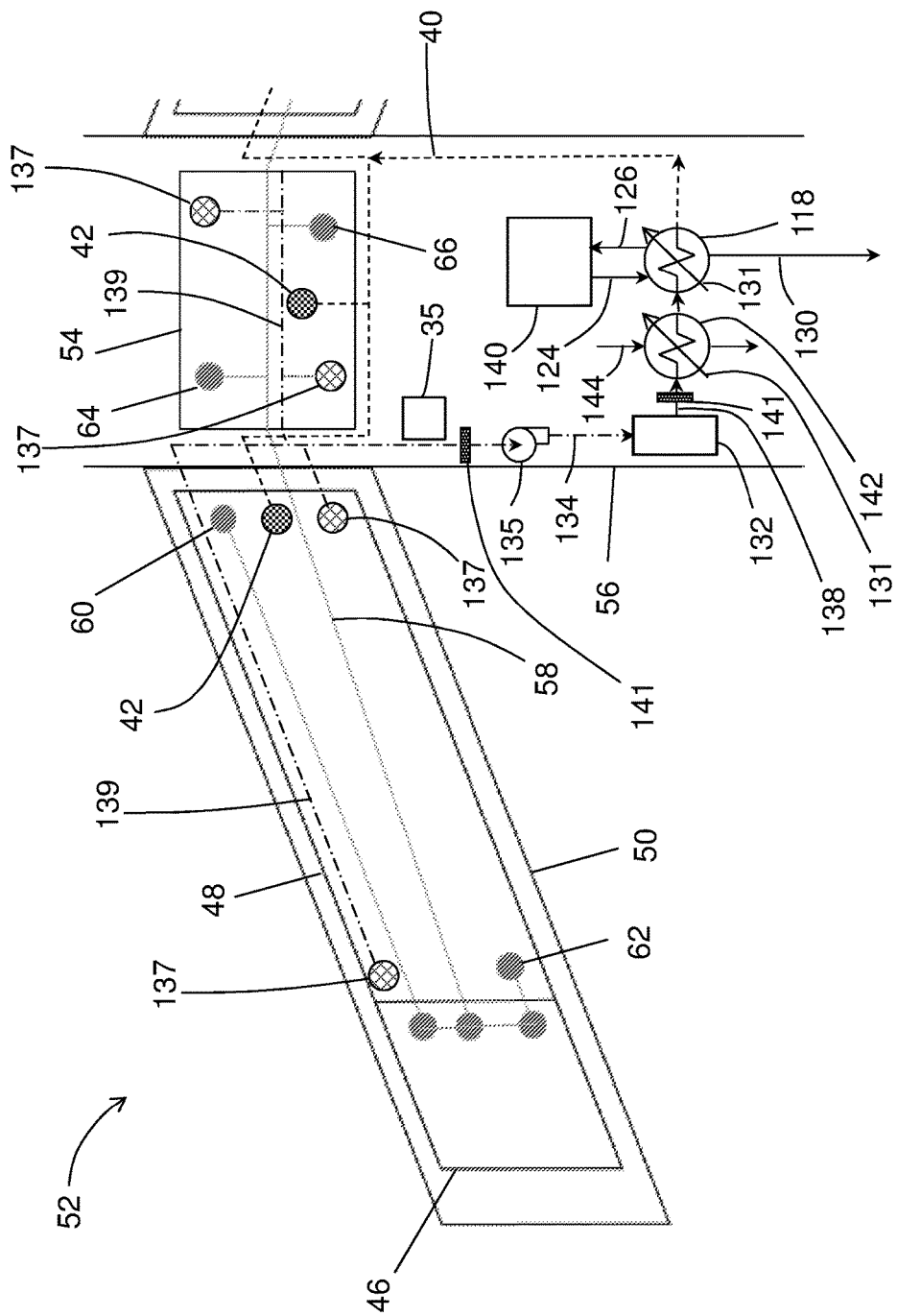
FIG. 3 is a schematic depiction of a catalytic combustion dried inert gas system.

As mentioned above, inert gas generators can include those based on catalytic combustion, and an example embodiment of a catalytic combustion inert gas system is schematically depicted in FIG. 3. As shown in FIG. 3, a catalytic reactor inert gas generator 132 receives a fluid flow 134 (assisted by ullage blower 135) from ullage gas collection vents 137 and ullage gas collection conduits 139. The ullage gas contains air components (oxygen and nitrogen) and fuel vapor. After applying heat to initiate the catalytic reaction, the reaction produces an oxygen-depleted stream 138 comprising water and $CO_2$ as well as residual fuel vapors, and residual air components (e.g., nitrogen and a reduced amount of oxygen). Combustion is contained to the catalytic reactor 132 with the assistance of flame arrestors 141. The oxygen-depleted stream 138 is fed first to optional ram air heat exchanger 142 where it is cooled by ram air 144. In some embodiments (e.g., on cold days or at higher altitudes such as above 10,000 feet), the cooling provided by the ram air heat exchanger 142 may be sufficient for maximizing water removal by condensation (e.g., by lowering the temperature of the inert gas to below the dew point with attention to avoid freezing, in which case the heat exchanger condenser 118 can be bypassed (bypass not shown) or inactivated by terminating the thermal connection to the cooling system 140. In some embodiments (e.g., at lower altitudes such as below 10,000 feet or on the ground), the ram air heat exchanger 142 can supplement the heat exchanger condenser 118 and reduce cooling load on the cooling system 140.

Figure 4:
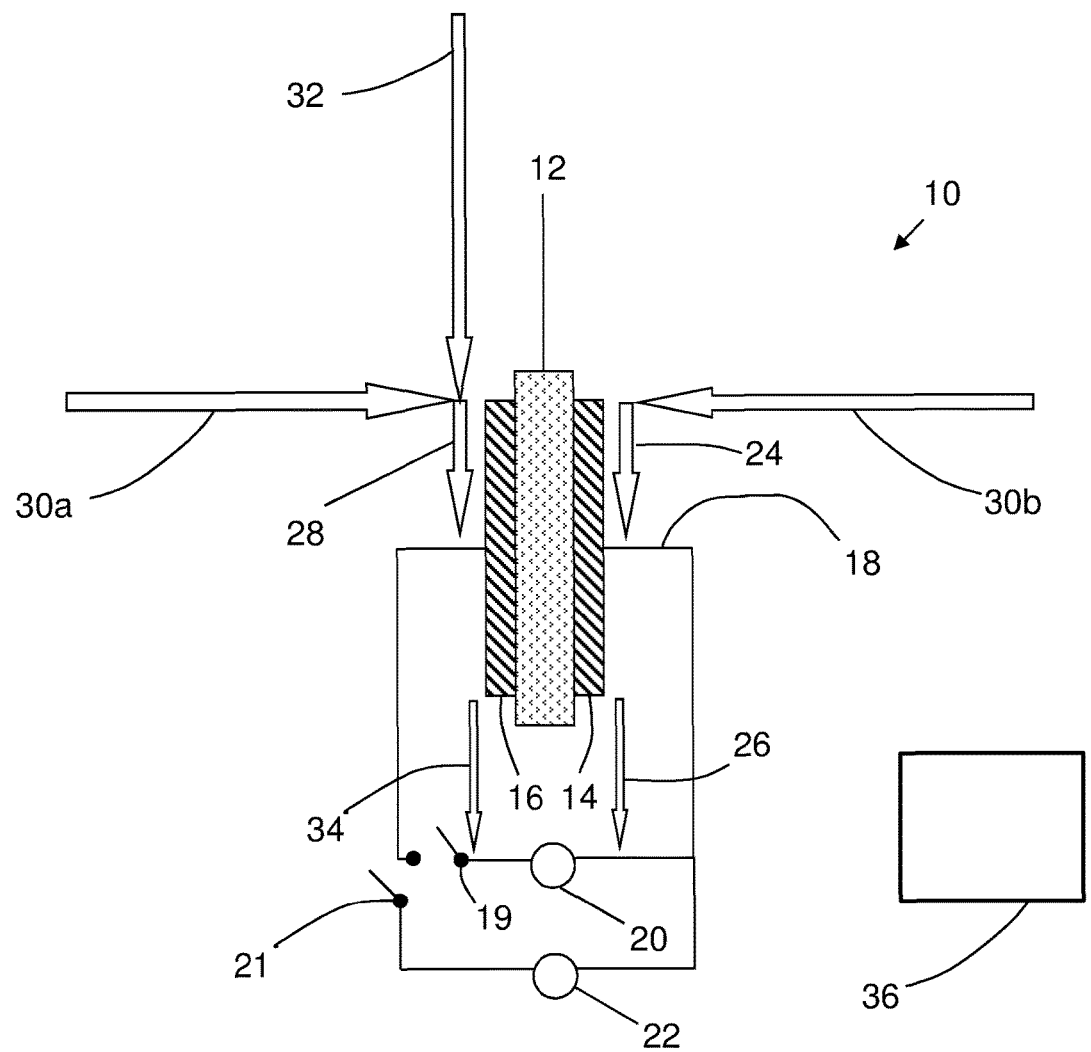
FIG. 4 is a schematic depiction of an example embodiment of an electrochemical cell.
Figure 5:
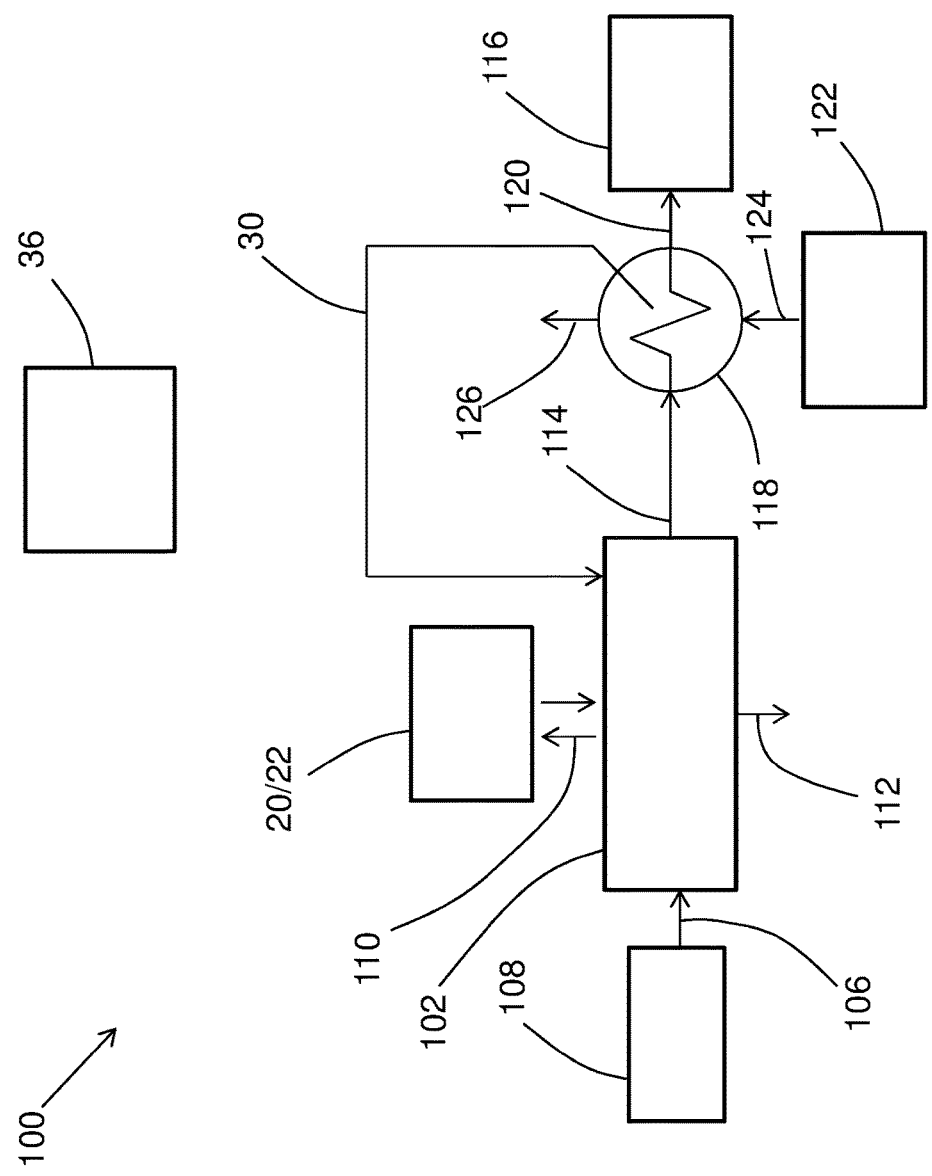
FIG. 5 is a schematic depiction of an example embodiment of an inert gas system comprising an electrochemical cell and a condenser.
Figure 6:
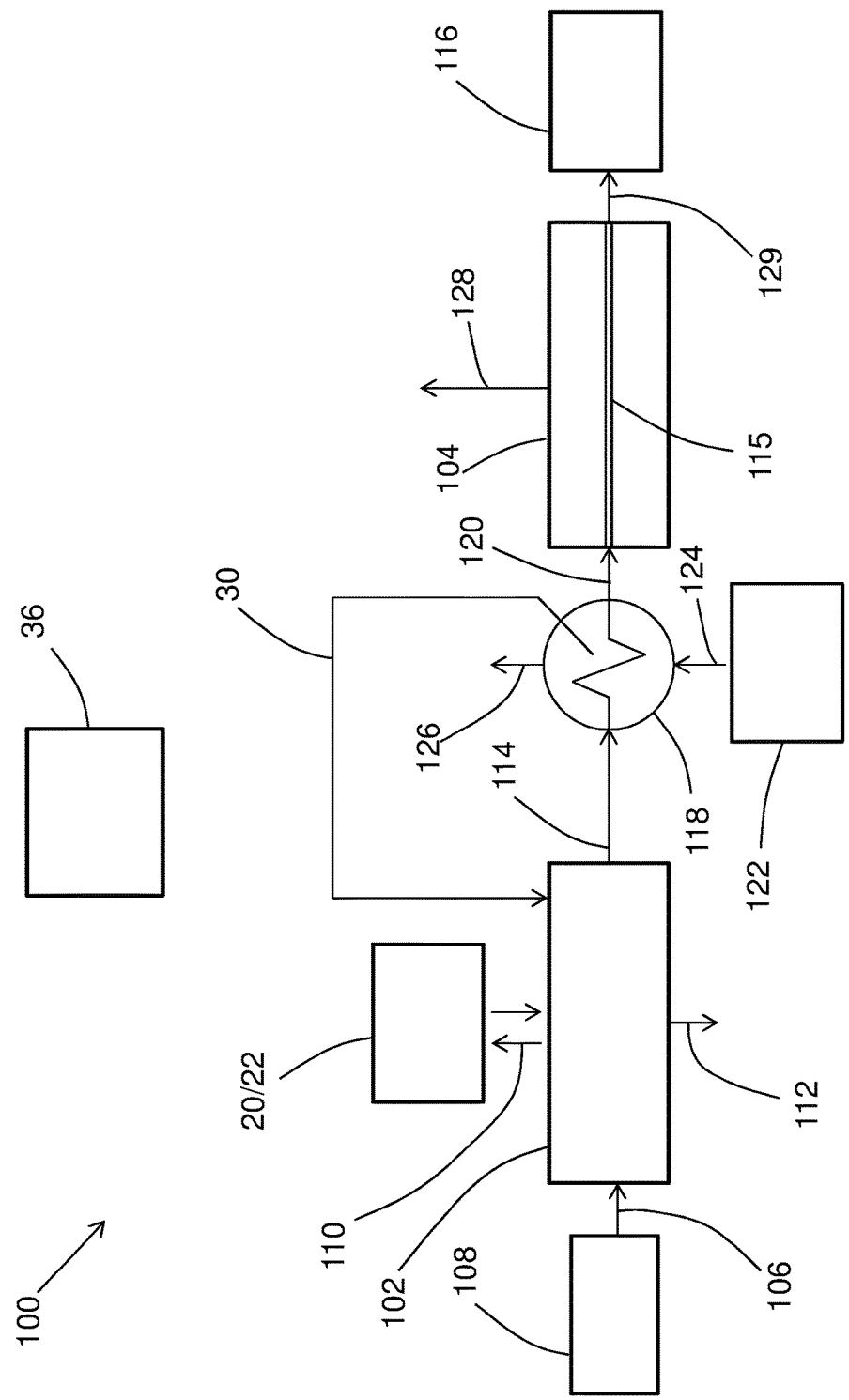
FIG. 6 is a schematic depiction of an example embodiment of an inert gas system comprising an electrochemical cell, a membrane separator, and a condenser.
Figure 7:
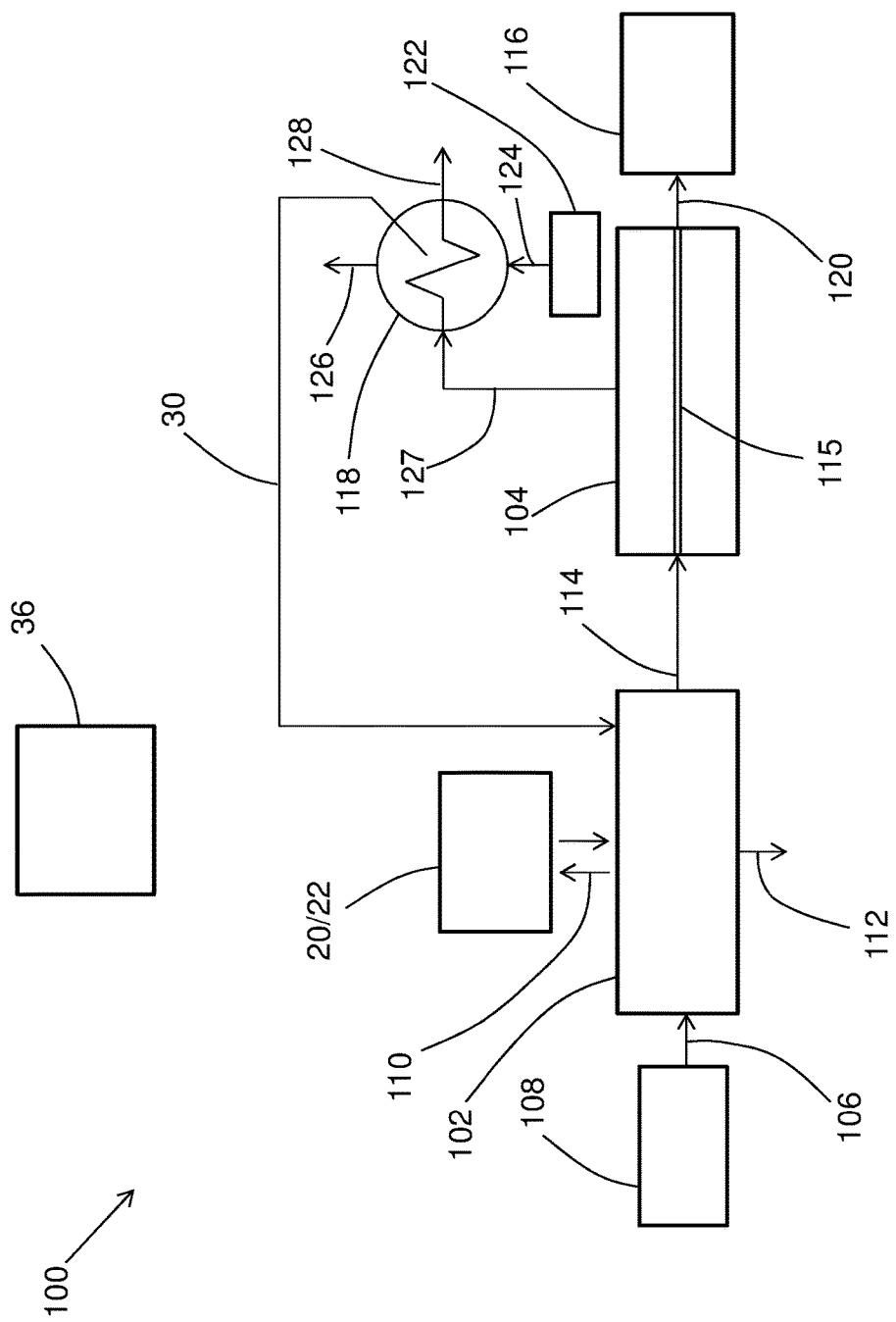
FIG. 7 is a schematic depiction of an example embodiment of an inert gas system comprising an electrochemical cell, a condenser, and a membrane separator.

In the case of PEM electrochemical cell inert gas generators, water discharged from the PEM electrochemical cell along with the oxygen-depleted can be replenished by a water flow path from a heat exchanger condenser back to the electrochemical cell, as shown in example embodiments depicted in FIGS. 5-7. In some embodiments, such configurations can provide needed water to the electrochemical cell with a reduced need for additional payload of stored on-board replenishment water. FIG. 4 schematically depicts an electrochemical cell 10. In this description, a single electrochemical cell is shown for ease of illustration; however, in practice there would typically be a plurality of cells electrically connected in series as a stack and perhaps a plurality of stacks connected either in series or in parallel. The electrochemical cell 10 comprises an electrolyte 12 having a cathode 14 disposed on one side and an anode 16 disposed on the other side. Cathode 14 and anode 16 are positioned adjacent to, and preferably in contact with the electrolyte 12 and can be metal layers deposited (e.g., by vapor deposition) onto the electrolyte 12, or can have structures comprising discrete catalytic particles adsorbed onto a porous substrate that is attached to the electrolyte 12. Alternatively, the catalyst particles can be deposited on high surface area powder materials (e.g., graphite or porous carbons or metal-oxide particles) and then these supported catalysts may be deposited directly onto the electrolyte 12 or onto a porous substrate that is attached to the electrolyte 12. Adhesion of the catalytic particles onto a substrate may be by any method including, but not limited to, spraying, dipping, painting, imbibing, vapor depositing, combinations of the foregoing methods, and the like. Alternatively, the catalytic particles may be deposited directly onto opposing sides of the electrolyte 12. In either case, the cathode and anode layers 14 and 16 may also include a binder material, such as a polymer, especially one that also acts as an ionic conductor. In this case, the cathode and anode layers 14 and 16 may be cast from an "ink," which is a suspension of supported (or unsupported) catalyst, ionomer, and a solvent that is typically an aqueous solution (e.g., a mixture of alcohol(s) and water) using processes that are like those used to make catalyst layers used in conjunction with electrolytes in fuel cells. Cathode 14 and anode 16 can be fabricated from catalytic materials suitable for performing the needed electrochemical reaction (e.g., the oxygen-reduction reaction on the cathode and the electrolysis of water on the anode). Exemplary catalytic materials include, but are not limited to, platinum, palladium, rhodium, carbon, gold, tantalum, tungsten, ruthenium, iridium, osmium, alloys thereof, and the like, as well as combinations of the foregoing materials.

The cathode 14 and anode 16 can be controllably electrically connected by electrical circuit 18 through controllable switch 19 to an electric power source 20 (e.g., DC power rectified from AC power produced by a generator powered by a gas turbine engine used for propulsion or by an auxiliary power unit). Switches 19 and 21 can be controlled by controller 35. In some embodiments, the system can optionally include a connection through controllable switch 21 to an electric power sink 22 (e.g., one or more electricity-consuming systems or components onboard the vehicle) with appropriate power conditioning, or power bus(es) for such on-board electricity-consuming systems or components, for optional operation in an alternative fuel cell mode. Inert gas systems with electrochemical cells that can alternatively operate to produce oxygen-depleted air in a fuel-consuming power production (e.g., fuel cell) mode or a power consumption mode (e.g., electrolyzer cell) are disclosed in pending U.S. patent application Ser. No. 15/151, 132 filed May 10, 2016, the disclosure of which is incorporated herein by reference in its entirety.

With continued reference to FIG. 4, cathode fluid flow path 24 directs air from an external source (e.g., fan, compressor, ram air flow) into contact with the cathode 14. Oxygen is electrochemically depleted from air along the cathode fluid flow path 24, and is discharged as oxygen-depleted air (ODA) at cathode exhaust 26 for delivery to an on-board fuel tank (not shown), or to a vehicle fire suppression system associated with an enclosed space (not shown), or controllably to either or both of a vehicle fuel tank or an on-board fire suppression system. An anode fluid flow path 28 is configured to controllably receive water from an anode-side water flow path 30a. The anode-side water flow path merges with and becomes coincident with (i.e., occupies the same space as) at least a portion of the anode fluid flow path 28. If the system is configured for alternative operation in a fuel cell mode, the anode fluid flow path 28 can be configured to controllably also receive fuel (e.g., hydrogen for a proton-transfer cell, hydrogen or hydrocarbon reformate for a solid oxide cell) from a fuel flow path 32. In some embodiments, the cathode fluid flow path 24 optionally receives water from a cathode-side water flow path 30b. The cathode-side water flow path merges with and becomes coincident with (i.e., occupies the same space as) at least a portion of the cathode fluid flow path 24. The anode-side water flow path 30a and cathode-side water flow path 30b can each be connected to separate or to a single water reservoir (not shown). Anode exhaust 34 can, depending on the type of cell and the anode exhaust content, be exhausted or subjected to further processing. Control of fluid flow along these flow paths can be provided through conduits and valves (not shown), which can be controlled by a controller 35.

In some embodiments, the electrochemical cell 10 can operate utilizing the transfer of protons across the electrolyte 12. Exemplary materials from which the electrochemical proton transfer electrolytes can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the electrolyte 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid fuel cells.

During operation of a proton transfer electrochemical cell in the electrolyzer mode, water at the anode undergoes an electrolysis reaction according to the formula $$H_2O \rightarrow \tfrac{1}{2}O_2 + 2H^+ + 2e^- \qquad (1)$$

The electrons produced by this reaction are drawn from an electrical circuit 18 powered by electric power source 20 connecting the positively charged anode 16 with the cathode 14 with switch 19 closed and switch 21 open. The hydrogen ions (i.e., protons) produced by this reaction migrate across the electrolyte 12, where they react at the cathode 14 with oxygen in the cathode flow path 24 to produce water according to the formula $$\tfrac{1}{2}O_2 + 2H^+ + 2e^- \rightarrow H_2O \qquad (2)$$

Removal of oxygen from cathode flow path 24 produces oxygen-depleted air exiting the region of the cathode 14. The oxygen evolved at the anode 16 by the reaction of formula (1) is discharged as oxygen or an oxygen-enriched air stream as anode exhaust 34.

During operation of a proton transfer electrochemical cell in a fuel cell mode, fuel (e.g., hydrogen) at the anode undergoes an electrochemical oxidation according to the formula $$H_2 \rightarrow 2H^+ + 2e^- \qquad (3)$$

The electrons produced by this reaction flow through electrical circuit 18 to provide electric power to electric power sink 22 with switch 19 open and switch 21 closed. The hydrogen ions (i.e., protons) produced by this reaction migrate across the electrolyte 12, where they react at the cathode 14 with oxygen in the cathode flow path 24 to produce water according to the formula (2).

$$\tfrac{1}{2}O_2 + 2H^+ + 2e^- \rightarrow H_2O \qquad (2)$$

Removal of oxygen from cathode flow path 24 produces oxygen-depleted air exiting the region of the cathode 14. Any unreacted hydrogen that exits anode 16 via anode exhaust flow path 34 can be recycled to fuel flow path 32 using an ejector or blower (not shown).

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice moisture will be removed by ODA 24 (either entrained or evaporated into the oxygen-depleted air) as it exits from the region of cathode 14. Accordingly, in some exemplary embodiments, water is circulated past the anode 16 along an anode fluid flow path (and optionally also past the cathode 14). Such water circulation can also provide cooling for the electrochemical cells. In some exemplary embodiments, water can be provided at the anode from humidity in air along an anode fluid flow path in fluid communication with the anode. In other embodiments, the water produced at cathode 14 can be captured and recycled to anode 16. It should also be noted that, although the embodiments are contemplated where a single electrochemical cell is employed, in practice multiple electrochemical cells will be electrically connected in series with fluid flow to the multiple cathode and anode flow paths routed through manifold assemblies.

Turning now to FIG. 5, an example embodiment of an electrochemical cell on-board inert gas system 100 is schematically depicted. For ease of illustration, the inert gas system 100 is not depicted on an aircraft as shown in FIGS. 1 and 3, but it is understood that the components could be disposed on an aircraft in a similar fashion as FIG. 1 or 3. As shown in FIG. 5, the inert gas system 100 includes an electrochemical cell, cell stack, or plurality of cell stacks 102. Air 106 from an air source 108 is fed to a cathode side flow path in the electrochemical cell (stack(s)) 102, where oxygen is consumed by the electrochemical reaction (2) above. Various types of air sources can be used, including but not limited to air from a compressor section of an onboard turbocompressor engine, air from a mechanically driven compressor such as a compressor powered by a rotating shaft connected to an auxiliary power unit turbine, air from an electrically powered compressor, ram air, conditioned air, and ambient air set in motion by fans, blowers, etc. In some embodiments, compressed air is used in order to provide a target pressure. In some embodiments, the compressed air is at a pressure of 25 to 60 psi (e.g., aircraft engine bleed air). In some embodiments (e.g., where an aircraft environmental control system is configured to operate at a lower pressure than conventional aircraft engine bleed air such as an all-electric aircraft architecture), the compressed air is at a lower pressure such as 5 to 20 psi. Depending on whether the electrochemical cell (stack(s)) 102 is operating in power consuming mode (i.e., electrolyzer mode) or power producing mode (i.e., fuel cell mode), electric power 110 is provided to or received from the electrochemical cell (stack(s)) 102 by a power source 20 or the power sink 22. Oxygen 112 from the anode side flow path can be exhausted to the outside or, if the system is operating at or above cabin pressure, discharged to the flight deck or cabin, or ducted to an engine intake, or used in an emergency oxygen system.

Oxygen-depleted air 114 from the cathode side flow path can contain significant amounts of water vapor (up to 100% relative humidity). The source of this water vapor can include water produced at the cathode by the reaction (2) above. In some embodiments an optional cathode-side water flow path (30*b*, FIG. 4), which can be present for a variety of reasons such as for temperature control or to maintain water-saturation of a proton exchange membrane, can also provide a source of liquid water for evaporation into the stream of oxygen-depleted air 114. As shown in FIG. 5, the oxygen-depleted air 114 is directed to the heat rejection side of heat exchanger condenser 118, where it rejects heat to a heat absorption side that is in thermal communication with a heat sink 122 that can provide a flow of relatively cool fluid 124 to absorb heat from the oxygen-depleted air 114. Water vapor in the stream of oxygen-depleted air 114 condenses to liquid water, which is directed from the heat exchanger condenser 118 to water flow path 30 back to the electrochemical cell(s) 102 where it can replenish water consumed at the anode by reaction (1) above or water lost from a cathode-side water flow path 30*b* (FIG. 4) by evaporation into the stream of oxygen-depleted air 114. Alternatively, water can be collected in a tank (not shown) that feeds the stack. Dried oxygen-depleted air 120 exiting the heat rejection side of the heat exchanger condenser 118 can be directed to onboard inert gas consuming systems 116 such as either or both of a fuel tank and a fire suppression system. Some embodiments may provide one or more technical effects, including but not limited to avoidance of undesirable water in a fuel tank being passivated by the oxygen-depleted air, or elimination of the need for carrying extra payload for stored water to replace water consumed at the anode or carried out of the system along with the stream of oxygen-depleted air.

The heat sink (i.e., cold source) 122 can be any type of heat sink, including but not limited to ambient air (e.g., fan-assisted blown air), ram air, conditioned air from an on-board ECS air cycle machine, a heat transfer fluid in communication with a heat rejection side of a heat exchanger in an on-board ECS air cycle machine, a heat transfer fluid in communication with a heat rejection side of a heat exchanger in an on-board ECS vapor cycle machine, a heat transfer fluid in communication with an evaporator of a vapor compression refrigerant loop, or liquid fuel in an on-board fuel tank. The heat absorption side outlet stream 126 from the heat exchanger condenser 118 can be returned to the heat sink 122, used in another onboard process, or discharged overboard (if it is inert such as an air or water stream).

In some embodiments, the inert gas system can be equipped with an optional membrane separator for further removal of water or oxygen from the inert gas. Example embodiments of system configurations including membrane separators are depicted in FIGS. 6 and 7. In some embodiments, the air source 108 can comprise a pre-cooled bleed flow from a compressor section of turbocompressor (pre-cooled so it can be safely transported in by or in proximity to vehicle structures such as aluminum structures), and a heat exchanger where it is further cooled to an electrochemical cell process temperature before being directed to the electrochemical cell (stack(s)) 102. The operating temperature of the PEM cell is less than the boiling point of water, and is generally compatible with that of the membrane gas separators, and in some embodiments (not shown) PEM electrochemical cell (stack(s)) 102 can be retrofit into an onboard system utilizing any or all of an original equipment or previously-installed source of bleed flow, an original equipment or previously-installed pre-cooler, or an original equipment or previously-installed fuel tank inerting heat exchanger (FTI HX) as heat exchanger.

As shown in FIG. 6, the dried oxygen-depleted air 120 exiting from the heat exchanger condenser 118 is directed to a membrane gas separator 104 where smaller oxygen or residual water molecules pass through a selective membrane 115 as exhaust stream 128 while larger nitrogen molecules flow with the stream of further dried or oxygen-depleted air 129 to the inert gas consuming systems 116. In some embodiments utilizing both electrochemical cell(s) and membrane gas separator(s) (whether retrofit or new installation) to deplete oxygen from an airstream, the system can provide oxygen-depleted air having an oxygen concentration sufficiently low (e.g., <10 ppm wt. that it can be used to sparge (i.e., bubble through) liquid fuel in a fuel tank to remove dissolved oxygen from the liquid fuel by introducing the oxygen-depleted air to a liquid fuel space in the tank.

In another example embodiment as shown in FIG. 7, heat exchanger condenser 118 does not directly treat the oxygen-depleted air 120 that goes on to the inert gas-consuming systems 116, but receives a portion 127 of the fluid flow from the cathode fluid flow path comprising oxygen and water that crosses the selective membrane 115 in membrane gas separator 104. In the FIG. 7 embodiment, the heat exchanger condenser 118 recovers and returns condensed water to the electrochemical cell(s) 102 that is separated from the gas stream by the membrane gas separator 104.

As disclosed above, the membrane 115, in different modes of operation, selectively transports hydrocarbon vapors or water. Various materials and configurations can be utilized for the gas separation membrane. Gas separation membranes can rely on one or more physical phenomena for selectivity in transportation of gases across the membrane. In some embodiments, a selective membrane can rely on size-selective pathways through the membrane that selectively allows transport of smaller molecules over larger molecules. Examples of such membranes include membranes that selectively allow transport of smaller water molecules over larger nitrogen molecules in air. Such membranes typically rely on molecule size-selective tortuous paths through a polymer matrix or through a porous metal or porous ceramic or other oxide to provide selectivity, and can rely on a bulk gas pressure differential between two sides of the membranes drives smaller molecules across the membrane while larger molecules remain behind. So-called reverse selective membranes rely on phenomena including the solubility of the gas molecules in the membrane material to promote selectivity for more highly soluble molecules over less soluble molecules, and can rely on a partial pressure differential provided by a concentration difference of membrane-soluble molecules in gases on two sides of the membrane to drive the soluble molecules across the membrane. Examples of such membranes include membranes that provide solubility for polar water molecules to promote selectivity for water molecules over non-polar oxygen or nitrogen molecules, or organic polymer membranes that provide solubility for organic fuel vapor molecules to promote selectivity for organic hydrocarbon molecules over inorganic oxygen or nitrogen molecules. Solubility factors can be used to promote selectivity for types of molecules regardless of size, i.e., solubility can be used to promote selectivity for larger molecules over smaller molecules or for smaller molecules over larger molecules. Selective materials for hydrocarbons include polyisoprene and other rubbery polymers. Selective materials for water include polyimides known for use in dehydration applications or 2,2-bistrifluoromethyl-4,5-difluoro-1,3-dioxole/tetrafluoroethylene. Selective materials for both hydrocarbons and water include polymers having polar or hydrophilic groups. Examples of materials that can have selectivity for water and hydrocarbon vapors include silicone rubbers (polydimethyl siloxane, polyoctylmethyl siloxane), polyethers (e.g., a copolymer of poly(ethylene oxide) (PEO) and poly(butylene therephthalate) (PBT), poly (4-methyl-2-pentyne), poly-trimethyl-silyl-propyne (PT-MSP). The gas selective membrane can include any of the above materials, alone or in combination with each other or other selective materials. Combinations of different materials can be integrated into a single membrane structure (e.g., in layers, or zones in the x-y plane of a membrane structure), or can be disposed in series or in parallel as separate membrane structures or modules.

During operation, the system can be controlled to set fluid flow rates (e.g. ullage gases, air, fuel, or water feed rates) and the current or voltage levels required (or produced by an electrochemical cell in fuel cell mode) to produce varying amounts of ODA in response to system parameters. Such system parameters can include, but are not limited to the humidity of the ODA, temperature of the fuel in the vehicle fuel tank(s), oxygen content of the fuel in the fuel tanks, oxygen content of vapor in the ullage of fuel tanks, temperature rise in an enclosed space such as a cargo hold or avionics bay, smoke and/or flame detection in said enclosed spaces, and temperature and/or pressure of vapor in the ullage of fuel tanks, and other on-board parameters such as temperature, oxygen content, and/or humidity level of ullage air. Accordingly, in some embodiments, the inert gas management system and components thereof such as shown in FIGS. 1-7 can include sensors for measuring any of the above-mentioned fluid flow rates, temperatures, oxygen levels, humidity levels, or current or voltage levels, as well as controllable output fans or blowers, or controllable fluid flow control valves or gates. These sensors and controllable devices can be operatively connected to the controller 35, which can be an independent controller dedicated to controlling the inert gas management system or the electrochemical cell, or can interact with other onboard system controllers or with a master controller. In some embodiments, data provided by the controller of the inert gas management system can come directly from a master controller.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An on-board aircraft dried inert gas system, comprising:
   a source of an inert gas comprising water;
   an air cycle cooling system comprising a primary heat exchanger, a compressor, a secondary heat exchanger, a turbine, and a condenser/reheater and a water removal unit, or a vapor cycle cooling system comprising a two-phase refrigerant cycled through a vapor-compression loop cycle comprising a compressor, a condenser, an expansion device, and an evaporator;
   a first heat exchanger condenser comprising a heat absorption side in thermal communication with the air cycle cooling system or with the vapor cycle cooling system, and a heat rejection side that receives the inert gas comprising water and outputs dried inert gas; and a second heat exchanger condenser comprising a heat absorption side in thermal communication with ram air and a heat rejection side that receives the inert gas comprising water and outputs dried inert gas.

2. The system of claim 1, wherein the source of inert gas comprising water comprises a proton exchange membrane electrochemical cell that reacts oxygen in air with hydrogen to produce the oxygen-depleted gas.

3. The system of claim 2, further comprising a water recycle of condensate from the heat rejection side of the heat exchanger condenser to the proton exchange membrane electrochemical cell.

4. The system of claim 1, wherein the source of inert gas comprising water comprises a catalytic reactor that reacts oxygen with hydrocarbon to produce the oxygen-depleted gas.

5. The system of claim 1, wherein the heat absorption side of the heat exchanger condenser is in thermal communication with the air cycle cooling system.

6. The system of claim 5, wherein the heat absorption side of the heat exchanger condenser receives, or is in thermal communication through a heat transfer fluid with, a conditioned air from the air cycle cooling system.

7. The system of claim 1, wherein the heat absorption side of the heat exchanger condenser is in thermal communication with the vapor cycle cooling system.

8. An on-board aircraft inert gas system, comprising:
a source of hydrogen;
a plurality of electrochemical cells, individually comprising a cathode and an anode separated by a proton exchange electrolyte separator;
a cathode fluid flow path in fluid communication with the cell cathodes that receives a flow of air from an air source and discharges oxygen-depleted air;
an anode fluid flow path in fluid communication with the cell anodes;
a water flow path in fluid communication with the proton exchange electrolyte separator
an electrical circuit connecting the anode and the cathode that provides voltage that forms hydrogen ions at the anode and forms water at the cathode;
a heat exchanger condenser comprising a heat absorption side in thermal communication with a heat sink, and a heat rejection comprising an inlet that receives fluid from the cathode fluid flow path, a water condensate outlet in fluid communication with the water flow path, and an inert gas outlet,
wherein the heat exchanger condenser includes a first heat exchanger condenser and a second heat exchanger condenser, and said heat sink includes;
an air cycle systems or a vapor cycle cooling system in thermal communication with a heat absorption side of the first heat exchanger condenser, wherein said air cycle cooling systems comprises a primary heat exchanger, a compressor, a secondary heat exchanger, a turbine, and a condenser/reheater and a water removal unit, and wherein said vapor cycle cooling system comprises a two-phase refrigerant cycled through a vapor-compression loop cycle comprising a compressor, a condenser, an expansion device, and a evaporator, and
ram air in thermal communication with a heat absorption side of the second heat exchanger condenser.

9. The system of claim 8, wherein the water flow path is in fluid communication with the anodes and is coincident with at least a portion of the anode fluid flow path.

10. The system of claim 8, wherein the water flow path is in fluid communication with the cathodes and is coincident with at least a portion of the cathode fluid flow path.

11. The system of claim 8, wherein the water flow path comprises an anode-side water flow path that is in fluid communication with the anodes and is coincident with at least a portion of the anode fluid flow path, and a cathode-side water flow path that is in fluid communication with the cathodes and is coincident with at least a portion of the cathode fluid flow path.

12. The system of claim 11, wherein the water flow path further comprises a water reservoir in fluid communication with the heat exchanger water outlet and with the anode-side and cathode-side water flow paths.

13. The system of claim 8, wherein the electrochemical cells are configured to operate at least a part of the time in a mode in which water is directed to the anode, electric power is provided to the electrical circuit at a voltage that electrolyzes water at the anode.

14. The system of claim 13, wherein the electrochemical cells are configured to operate at least a part of the time in a mode in which hydrogen fuel is directed to the anode, and electric power is directed from the circuit to one or more vehicle electric power-consuming systems or components.

15. The system of claim 8, wherein the electrochemical cells are configured to operate at least a part of the time in a mode in which hydrogen fuel is directed to the anode, and electric power is directed from the circuit to one or more vehicle electric power-consuming systems or components.

16. The system of claim 8, wherein the proton exchange electrolyte separator comprises a polymer proton exchange membrane.

17. The system of claim 8, wherein the plurality of electrochemical cells are connected in electrical series in a stack.

18. The system of claim 8, wherein the heat sink comprises an on-board air cycle or vapor cycle cooling system, ram air, or liquid fuel in an on-board fuel tank.

* * * * *